United States Patent
Peracha et al.

(10) Patent No.: US 7,752,303 B2
(45) Date of Patent: Jul. 6, 2010

(54) DATA REPORTING USING DISTRIBUTION ESTIMATION

(75) Inventors: Zahur Peracha, Union City, CA (US);
Rajpal Singh Sodhi, Foster City, CA (US); Jyoti Bansal, San Francisco, CA (US)

(73) Assignee: Wily Technology, Inc., Brisbane, CA (US)

( * ) Notice: Subject to any disclaimer, the term of this patent is extended or adjusted under 35 U.S.C. 154(b) by 1024 days.

(21) Appl. No.: 11/361,815

(22) Filed: Feb. 23, 2006

(65) Prior Publication Data

US 2007/0198699 A1 Aug. 23, 2007

(51) Int. Cl.
*G06F 15/173* (2006.01)
(52) U.S. Cl. .................. 709/224; 717/118; 717/127
(58) Field of Classification Search .......... 709/223, 709/224; 717/118, 127
See application file for complete search history.

(56) References Cited

U.S. PATENT DOCUMENTS

| | | | | |
|---|---|---|---|---|
| 6,512,515 B1* | 1/2003 | Smith et al. | ............... | 345/419 |
| 7,158,052 B2* | 1/2007 | Zammit-Mangion et al. | ..... | 340/959 |
| 7,299,277 B1* | 11/2007 | Moran et al. | ............... | 709/224 |
| 7,433,880 B2* | 10/2008 | Hutchins et al. | ........... | 707/101 |
| 2002/0174421 A1* | 11/2002 | Zhao et al. | ................ | 717/174 |
| 2003/0065986 A1* | 4/2003 | Fraenkel et al. | .............. | 714/47 |
| 2003/0114767 A1* | 6/2003 | Heim | ..................... | 600/504 |
| 2003/0226062 A1* | 12/2003 | Gender et al. | .............. | 714/38 |
| 2004/0163079 A1* | 8/2004 | Noy et al. | ................. | 717/154 |
| 2004/0205723 A1* | 10/2004 | Juan et al. | ................. | 717/124 |
| 2005/0102272 A1* | 5/2005 | Kumar et al. | ................ | 707/2 |
| 2006/0143075 A1* | 6/2006 | Carr et al. | ................. | 705/14 |
| 2007/0083648 A1* | 4/2007 | Addleman et al. | ......... | 709/224 |
| 2007/0192060 A1* | 8/2007 | Yam et al. | ................. | 702/181 |

* cited by examiner

*Primary Examiner*—Oanh Duong
(74) *Attorney, Agent, or Firm*—Vierra Magen Marcus & DeNiro LLP (57) ABSTRACT

Application data is reported in response to monitoring an application transaction. Application data is obtained for an initial period of time. A function which estimates the application data is then identified for the reported application data. After identifying the function, subsequent application data is obtained, and function data is generated from the subsequent application data. The function data may be associated with function parameters associated with the identified function. A function can then be constructed from the reported function data. The function constructed from the function data may estimate application data associated with the monitored transactions.

23 Claims, 6 Drawing Sheets

DATA REPORTING USING DISTRIBUTION ESTIMATION

BACKGROUND

With the variety of web services available, a user has many choices for a particular Internet service. It is in a web service provider's best interest to distinguish itself from its competitors and ensure its web service provides a positive user experience. Additionally, many web service providers must meet service level agreements (SLA) for their clients. An SLA is an agreement specifying a service performance level that a service provider must adhere to. For example, an SLA may indicate a service provider is to provide a web service with ninety percent of its transaction response times being 200 milliseconds or less. To achieve a positive user experience and client expectations, many web service providers monitor their provided web service to determine any problems or delays in providing the service to users.

One way of measuring website performance is by reporting transaction information for an application which provides the web service. Metrics are typically recorded and averaged over time. Averaging transaction data for a website gives information regarding a period of time, but not detailed information for the specific transactions which occur over time. In particular, averaging data for website transactions causes a loss of granularity, and prevents administrators from realizing how different transactions exist and affect overall application performance.

The details of application performance data can be reported, but this requires significant processing power. Thus, reporting every detail of every transaction for a web service would adversely affect the performance of the web service. Additionally, when processing the entire set of application data to determine certain performance thresholds, the parameters to report are typically predefined. Thus, as different thresholds and parameters are processed, the code which implements the data processing may need to be changed for each implementation.

SUMMARY

The technology described herein pertains to data reporting with respect to application performance. An application performing one or more transactions may be monitored by monitoring code. The monitoring code may report application data associated with the one or more transactions for an initial period of time. A function may then be identified for the application data reported during the initial period of time. In one embodiment, the identified function is one which best fits the reported application data from a set of functions.

After the function is identified, the monitoring code will report subsequent application data. The application data is fitted to the function and a set of application data (e.g., a mean, count, standard deviation and/or other data is created as function data from the subsequent reported application data).

Function data associated with a transaction requires less memory space than the corresponding application data. By constructing a distribution of function values from the function data, application data can be estimated without storing the application data itself. Estimating application data as function values without storing the application data saves processing, communication and memory resources.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Data associated with an application transaction is reported in response to monitoring the application. An application performing one or more transactions may be monitored using monitoring code. The monitoring code may be inserted in the application and report application data. Application data may be reported for an initial period of time. After the initial period of time, a function is identified for the reported application data. Identifying the function may include selecting a best fitting function for the application data reported during the initial period of time.

After the function is identified, the monitoring code will report subsequent application data. The application data is fitted to the function and a set of application data (e.g., a mean, count, standard deviation and/or other data is created as function data from the subsequent reported application data).

Once the function is identified, the monitoring code will report subsequent application data. Function data is then created from the subsequent application data. Thus, application data is fitted to the function and a set of application data. A function can then be generated from the function data. The function constructed from the function data may serve as an estimation of the application data associated with the one or more monitored transactions.

Function data associated with a transaction requires less memory space than the corresponding application data. By constructing a function from function data, an estimation of application data for the monitored transaction(s) may be provided without storing the application data itself. Providing a function without reporting most of the application data saves processing, communication and memory resources. Thus, estimations of application data associated with application transactions may be analyzed while minimizing the load on system, programmer, and other resources.

Figure 1:
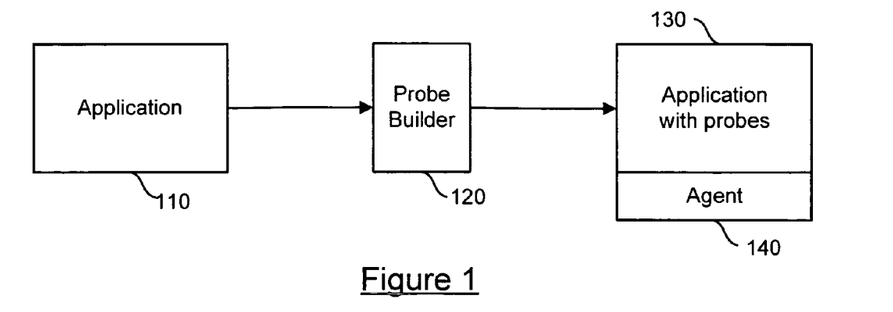
FIG. 1 is a block diagram illustrating how byte code for an application is instrumented.

In one embodiment, the technology herein can be used to monitor behavior of an application on an application server using bytecode instrumentation. The technology herein may also be used to access information from the particular application. To monitor the application, an application management tool may instrument the application's object code (also called bytecode). FIG. 1 depicts an exemplar process for modifying an application's bytecode. FIG. 1 shows Application 110, Probe Builder 120, Application 130 with probes and Agent 140. Application 130 includes probes used to access information from the application, and application 110 is the application before the probes are added. Application 110 can be a Java application or a different type of application.

Probe Builder 120 instruments (e.g. modifies) the bytecode for Application 110 to add probes and additional code to Application 110 in order to create Application 130. The probes may measure specific pieces of information about the application without changing the application's business logic. Probe Builder 120 also generates Agent 140. Agent 140 may be installed on the same machine as Application 130 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2:
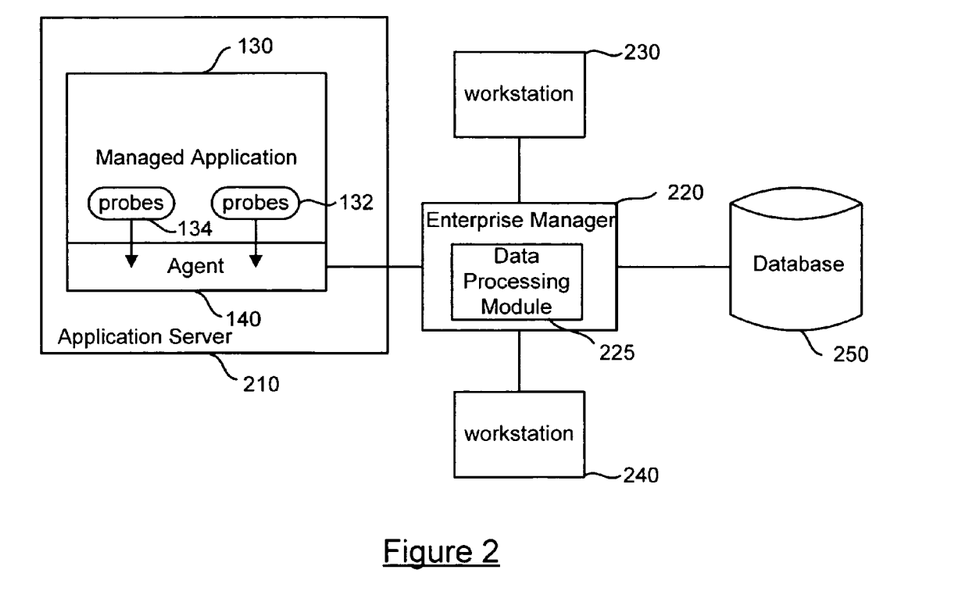
FIG. 2 is a block diagram of a system for monitoring an application.

FIG. 2 is a conceptual view of the components of the data reporting technology. In addition to managed Application 140 with probes 132 and 134, FIG. 2 also depicts Enterprise Manager 220, database 250, workstation 230 and workstation 240. As a managed application runs, probes (e.g. 132 and/or 134) relay data to Agent 140. In one embodiment, probes 132 and 134 may be implemented in objects and other code that write data, change data or otherwise cause the state of an application server to change. Agent 140 then collects, summarizes and sends the data to Enterprise Manager 220.

Enterprise Manager 220 receives performance data from managed applications via Agent 140, runs requested calculations, makes performance data available to workstations 230-240 and optionally sends performance data to database 250 for later analysis. The workstations (e.g. 124 and 126) provide the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In one embodiment, workstations 230-240 and database 250 are not used or needed to generate synthetic transactions.

In one embodiment of the system of FIG. 2, each of the components is running on different machines. That is, workstation 230 is on a first computing device, workstation 240 is on a second computing device, Enterprise Manager 220 is on a third computing device, and Managed Application 130 is running on a fourth computing device. In another embodiment, two or more (or all) of the components are operating on the same computing device. For example, Managed Application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 3:
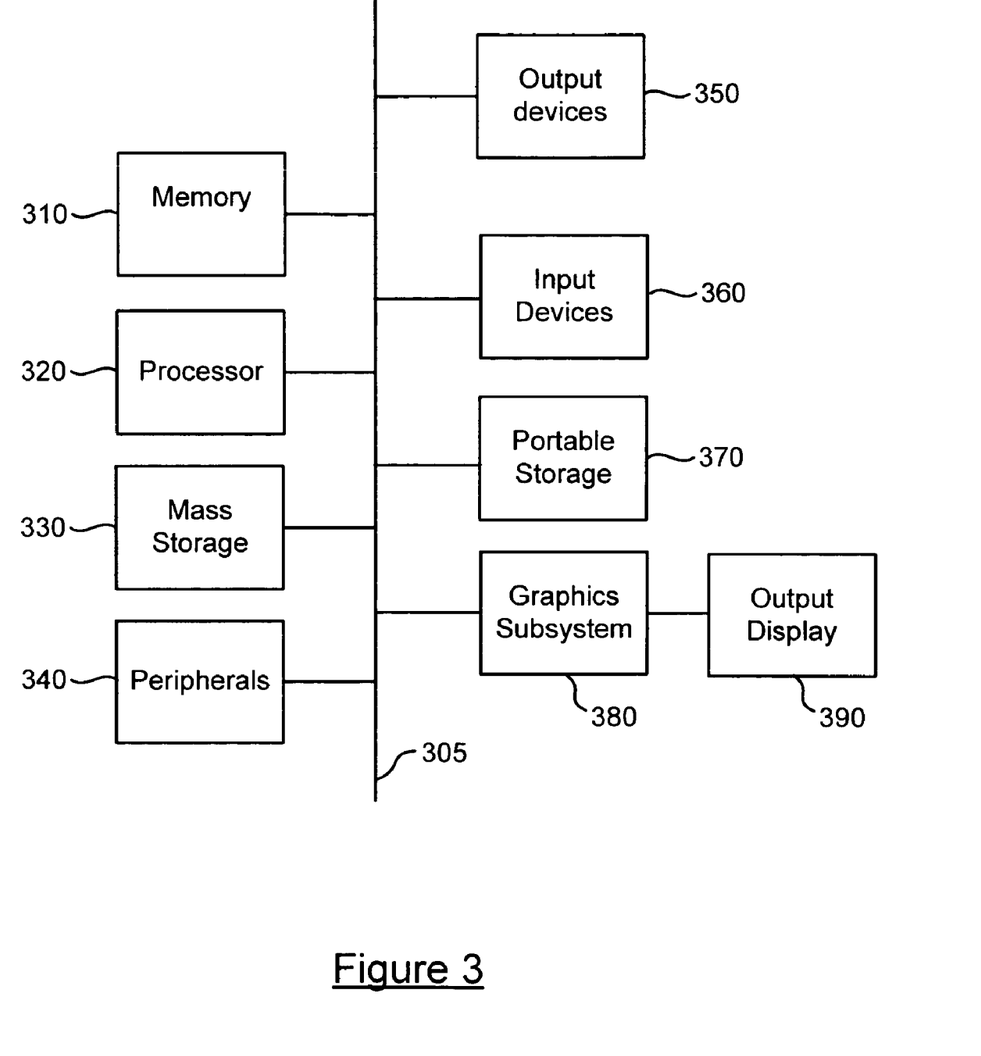
FIG. 3 is a block diagram of an embodiment of a system for reporting data.

FIG. 3 illustrates an embodiment of a computing system for use with the present technology. In one embodiment, the system of FIG. 3 may be used to implement application server 210, work stations 230-240 and database 250 of FIG. 2.

The computer system of FIG. 3 includes one or more processors 320 and main memory 310. Main memory 310 stores, in part, instructions and data for execution by processor unit 320. If the system of the present invention is wholly or partially implemented in software, main memory 310 can store the executable code when in operation. The system of FIG. 3 further includes a mass storage device 330, peripheral device(s) 340, output devices 350, user input device(s) 360, portable storage medium drive(s) 370, a graphics subsystem 380 and an output display 390. For purposes of simplicity, the components shown in FIG. 3 are depicted as being connected via a single bus 305. However, the components may be connected through one or more data transport means. For example, processor unit 320 and main memory 310 may be connected via a local microprocessor bus, and the mass storage device 330, peripheral device(s) 340, portable storage medium drive(s) 370, and graphics subsystem 64 may be connected via one or more input/output (I/O) buses. Mass storage device 330, which may be implemented with a magnetic disk drive or an optical disk drive, is a non-volatile storage device for storing data and instructions for use by processor unit 320. In one embodiment, mass storage device 330 stores the system software for implementing the present invention for purposes of loading to main memory 310.

Portable storage medium drive 370 operates in conjunction with a portable non-volatile storage medium, such as a floppy disk, to input and output data and code to and from the computer system of FIG. 3. In one embodiment, the system software for implementing the present invention is stored on such a portable medium, and is input to the computer system via the portable storage medium drive 370. Peripheral device (s) 340 may include any type of computer support device, such as an input/output (I/O) interface, to add additional functionality to the computer system. For example, peripheral device(s) 340 may include a network interface for connecting the computer system to a network, a modem, a router, etc.

User input device(s) 360 provides a portion of a user interface. User input device(s) 360 may include an alpha-numeric keypad for inputting alpha-numeric and other information, or a pointing device, such as a mouse, a trackball, stylus, or cursor direction keys. In order to display textual and graphical information, the computer system of FIG. 3 includes graphics subsystem 380 and output display 390. Output display 390 may include a cathode ray tube (CRT) display, liquid crystal display (LCD) or other suitable display device. Graphics subsystem 380 receives textual and graphical information, and processes the information for output to display 390. Additionally, the system of FIG. 3 includes output devices 350. Examples of suitable output devices include speakers, printers, network interfaces, monitors, etc.

The components contained in the computer system of FIG. 3 are those typically found in computer systems suitable for use with the present invention, and are intended to represent a broad category of such computer components that are well known in the art. Thus, the computer system of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 4:
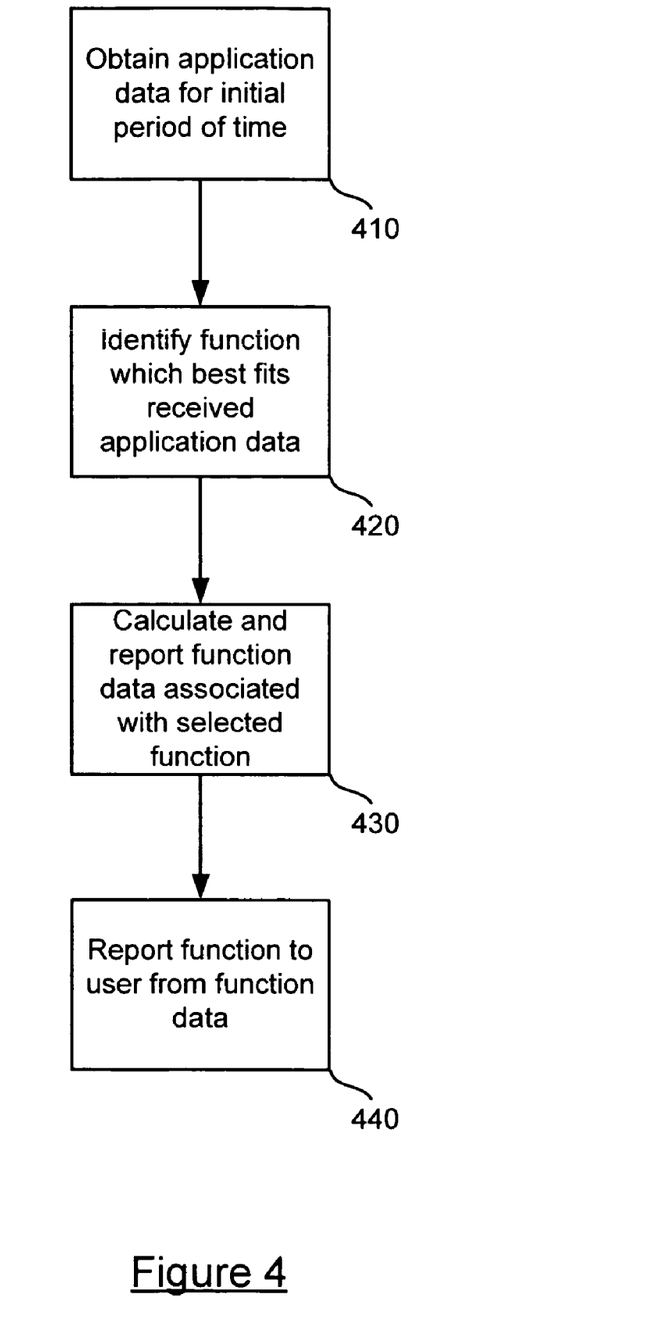
FIG. 4 is a flow chart of an embodiment of a process for reporting data.

FIG. 4 is a flow chart of an embodiment of a process for reporting data. First, application data is obtained for an initial period of time at step 410. In one embodiment, the application data is first obtained by Agent 140. Agent 140 may obtain the application data from probes 132-134 within the application being monitored. The application data is aggregated by Agent 140 and sent to a processing module, for example Enterprise Manager 220. Enterprise Manager 220 then receives the aggregated data from Agent 140. Thus, the application data can be obtained by Agent 140, Enterprise Manager 220 or both. In one embodiment, the application data is sent to Enterprise Manager 220 periodically. The period for aggregating data between data reporting may be determined based on system resources. For example, application data may be aggregated and sent to Enterprise Manager 220 every fifteen seconds. Application data may be obtained for every instance of a particular transaction. For example, the monitored transaction metric may be a response time. In this case, each time a transaction is completed, Agent 140 will record the response time associated with the transaction and send the aggregated response times to Enterprise Manager 220.

In one embodiment, the initial period of time during which application data is obtained and reported to Enterprise Manger 220 may be determined based on system resources and the data being obtained. After this initial period of time, subsequent application data is received and processed as discussed in more detail below with respect to step 420. The initial period of time may be enough time to gather the entire range or a majority of the range of values associated with a distribution of data for the transaction. Several factors can be considered when determining the length of the initial period of time. In one embodiment, a longer initial period of time allows for more data points to be recorded in generating the distribution. Thus, the distribution is more likely to include a complete representation of the possible data values of the distribution. A shorter period of time will result in a distribution with fewer data points, but will require less bandwidth to report and process the data. For example, the initial period of time may be between two and five minutes. In some embodiments, the initial period of time in which application data is received at step 410 may be defined by user or administrator when taking into consideration the requirements and resources of the system.

A function which best fits the application data is identified at step 420. The identified function may be selected from one or more distribution functions. In one embodiment, identifying a function includes analyzing the received application data. The application data may be analyzed at Agent 140, Enterprise Manager 220 or some other module. This may be determined based on the particular system, system resources and other factors. Identifying a function may include identifying a function that best fits the received application data. In some embodiments, identifying a function may include selecting a function which satisfies a set of criteria. The criteria may be a processing requirement, a determined best fit using an error function for the comparison, or some other criteria.

In one embodiment, an error function is used to determine the fit associated with each function with respect to the application data. Any of several error functions may be used to determine the best fit function for the application data. Identifying a best fitting function may also include providing function parameters to Agent 140. If Agent 140 identified the function, Agent 140 retrieves the function parameters itself. If Enterprise Manager 220 identified the function, it determines the function parameters and sends them to Agent 140. Identifying a function associated with received application data is discussed in more detail below with respect to FIG. 5.

Function data associated with the selected function is calculated and reported from subsequent application data at step 430. After selecting the function at step 420, additional application data is received. The function data is calculated from the additional application data. Function data may be received for one or more periods of time which occur after the initial period associated with step 410. The function data is reported by Agent 140 to Enterprise Manager 220. In one embodiment, receiving function data may include receiving function data from a module that generates the function data from application data. For example, application data is received by Agent 140 after the initial period. The function data may be derived from, be a portion of, or include data other than the application data received at step 410.

In some embodiments, the function data is derived at least in part from the function parameters. For example, the function parameters may specify what type of function data to report (e.g., total count, total mean, and sum of squares for a normal distribution). In some embodiments, the function data may be processed and reported to Enterprise Manager 220 periodically. After receiving function data, the data is stored by Enterprise Manager 220 until the data is needed. Receiving function data is discussed in more detail below with respect to FIG. 6.

After calculating and reporting function data, a function is reported from the function data at step 440. In one embodiment, the reported function is generated from the reported function data and other data. The other data may include function parameters, user data received by Enterprise Manager 220, and other data. The user data may specify a time period, range of values or thresholds, or other information associated with application data to report. Reporting a function from function data is discussed in more detail below with respect to FIG. 7.

Figure 5:
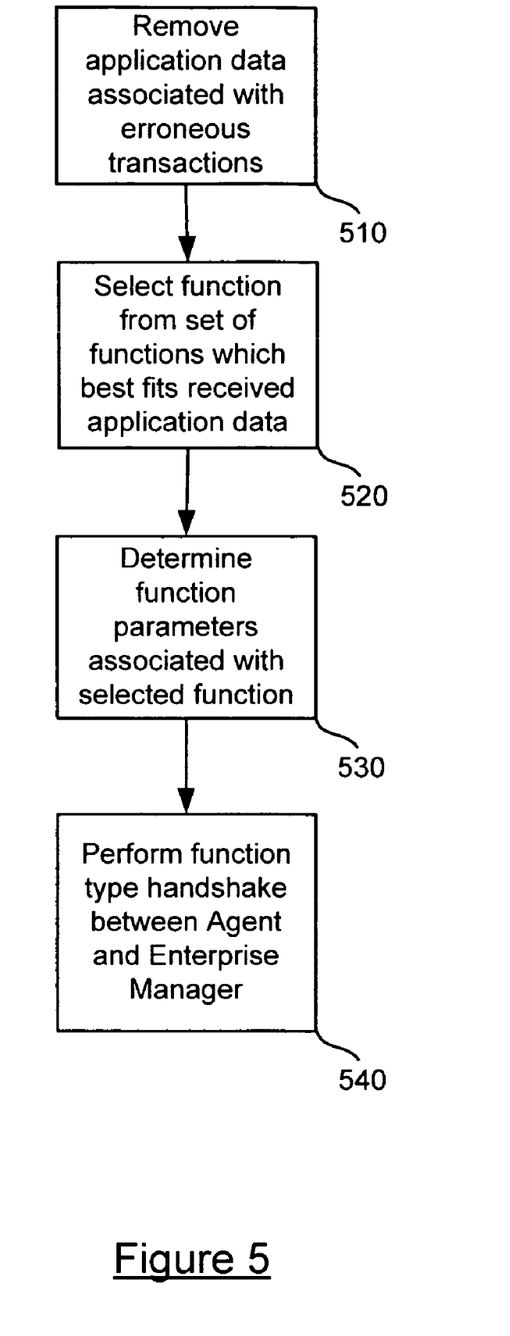
FIG. 5 is a flow chart of an embodiment of a process for identifying a function.

FIG. 5 is a flow chart of an embodiment of a process for identifying a function. In one embodiment, the flow chart of FIG. 5 provides more detail for step 420 of FIG. 4 discussed above. The process described by the flow chart of FIG. 5 may be performed at either Agent 140 or Enterprise Manager 220. In one embodiment, the process described by the flow chart of FIG. 5 is performed by a module which may identify the function while using the least bandwidth or processing resources. For example, although Enterprise Manager 220 may have more processing power then Agent 140, the time and resources required to send the application data and retrieve function parameters from Enterprise Manager 220 by Agent 140 may be more costly than having Agent 140 do the processing itself.

First, application data associated with erroneous transactions is removed at step 510. In this case, application data collected during the initial period and associated with an error is removed from the set of data. Erroneous data is removed because the data is associated with transactions which may adversely affect some metrics and hinder selection of a function. For example, transactions resulting in an error may end much sooner than normal transactions. As a result, the data associated with the erroneous transaction could alter the later identified function associated with the application transaction. Errors may be detected for a particular transaction by monitoring exceptions thrown, error code which is retrieved and executed, and other error identification messages.

Erroneous data may also be associated with stalled transactions. For example, application data comprising response times associated with a stalled transaction can be erroneously long. The long response times can adversely affect which function is selected for the application data. In this case, data associated with stalled transactions may be removed from the application data reported during the initial period.

After removing application data associated with any erroneous transactions, a function is selected from a set of functions which best fits the received application data at step 520. Determining a best fitting function includes comparing values for one or more distribution functions to the values of the reported application data. The best fitting function may be one which approximates the application data better than other functions compared to the application data. As discussed above, other criteria can also be used to select a function.

An error function may be used to determine the amount of error between the values for each function and the application data. In this case, the function associated with the smallest calculated error is identified as the best fitting function. Examples of functions which can be used to determine a best fitting function for application data include normal, Gaussian, chi-squared, Rayleigh, Cauchy, Weibull log normal, polynomial, exponential and other functions. In one embodiment, a selected function may be any formula, formulas, expressions or other information that may be used to represent a distribution of data values. Types of error functions that may be used to determine which function fits the application data the best may include linear least squares, non-linear least squares, Levenberg-Marquardt, Gauss-Newton algorithms and other error calculation functions.

After the function is selected, function parameters associated with the selected function are determined at step 530. The function selected at step 520 is associated with one or more function parameters. The function parameters are used to specify function data to be calculated and reported. The function data is then used to construct a function, which can be used to estimate application data.

The function parameters may be retrieved from a look-up table or otherwise stored in memory accessible by either Agent 140 or Enterprise Manager 220. For example, for normal or Guassian type functions, the function values can be calculated from the mean, count and standard deviation. The function parameters are mean, count and sum of squares for each individual response time. Thus, for a Gaussian type function, the retrieved function parameters may include mean, count and sum of squares information. The standard deviation for the data may be calculated from the count and sum of squares function parameters. This is discussed in more detail below.

After determining function parameters, a function type handshake is performed between Agent 140 and Enterprise Manager 220 at step 540. The information regarding the selected function is communicated between Agent 140 and Enterprise Manager 220 at step 540. In one embodiment, function information is communicated from the module which determines the distribution type to the other module. For example, when Enterprise Manager 220 determines the function from the application data, Enterprise Manager 220 instructs Agent 140 to gather and report function data associated with the function parameters. Agent 140 may then confirm the instruction received by the Enterprise Manager 220 and proceed to generate the distribution data from subsequent collected application data. When Agent 140 selects the function, Agent 140 notifies Enterprise Manager 220 of the function selected for the given transaction.

Figure 6:
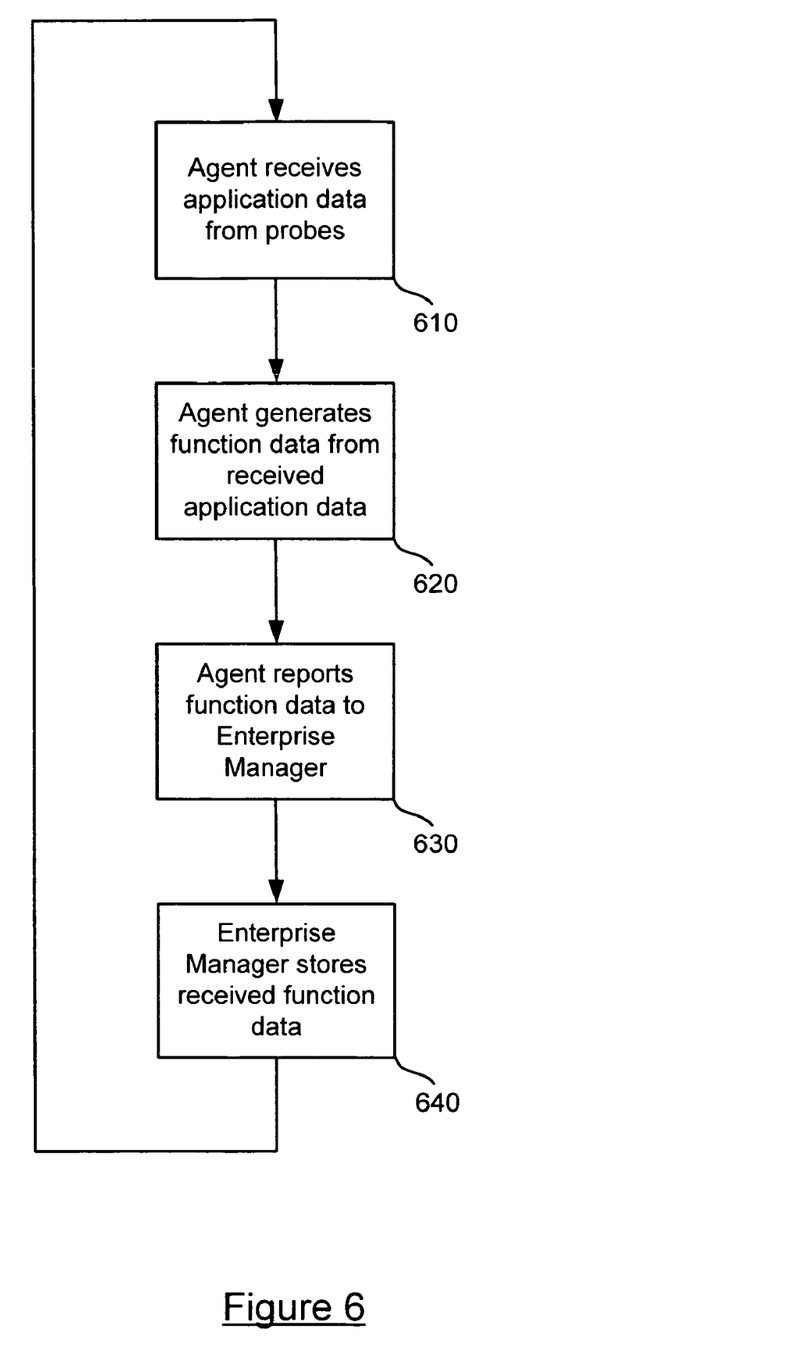
FIG. 6 is a flow chart of an embodiment of a process for calculating and reporting function data.

FIG. 6 is a flow chart of an embodiment of a process for calculating and reporting function data. In one embodiment, the flow chart at FIG. 6 provides more detail for step 430 of FIG. 4 discussed above. First, Agent 150 receives application data at step 610. The application data is similar to that received at step 410 of FIG. 4. In particular, Agent 140 receives the application data from probes 132-134 within application 130. However, the application data received at step 610 is received after the initial period of time associated with step 410.

Agent 140 calculates function data from the received application data at step 620. In this case, Agent 140 generates function data associated with the function parameters determined earlier. For example, in the case of a Gaussian function, the function parameters are count, mean, and sum of squares. In this case, Agent 140 will track the number of instances of data received as the count, take the mean of the data, and determine the sum of squares for each data instance. The sum of squares may be determined in two steps. First, for each instance of data received, the difference between the application data value and the corresponding function value is determined and squared. The squared results for each data instance are then added together. An example of generating function data from application data is discussed in more detail below.

Agent 140 reports the generated function data to Enterprise Manager 220 at step 630. In some embodiments, Agent 140 reports function data to Enterprise Manager 220 periodically, for example every fifteen seconds. In this case, the function data is generated periodically for transmission to Enterprise Manager 220.

After reporting the distribution data, Enterprise Manager 220 stores the received function data at step 620. After storing the received distribution data, the flow chart of FIG. 6 returns to step 610 where Agent 140 receives additional application data. In one embodiment, steps 610-640 of the flow chart of FIG. 6 repeat in order to capture as much data as possible for a particular transaction being monitored.

Figure 7:
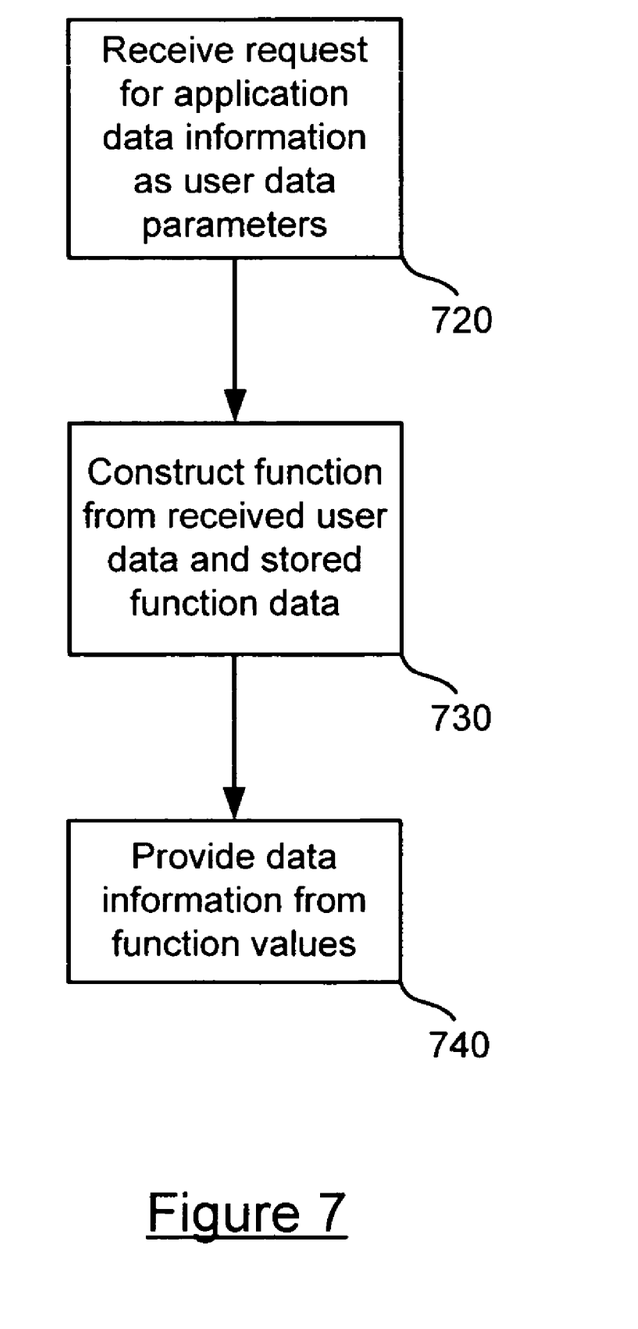
FIG. 7 is a flow chart of an embodiment of a process for reporting function values from function data.

FIG. 7 is a flow chart of an embodiment of a process for reporting a function from function data. In one embodiment, the flow chart of FIG. 7 provides more detail for step 440 of FIG. 4 discussed above. A function can be reported in response to receiving a request for application data information. Though the function provided in response to the application data request is not actual application data, it can be used to estimate application data values. The generated function is associated with a margin of error with respect to the application data. The error is associated with the function selected at step 420 of FIG. 4.

First, a request for application data information is received as one or more user data parameters at step 720. In one embodiment, the application data information may be derived from a service level agreement for web service performance associated with application 130. The user data parameters may be received through a user interface, through software encoding, or in some other manner. User data parameters may specify a portion of a function to present information on. Thus, user data parameters may be used to specify function values to be reported in step 740 below. In particular, user data parameters may include a period of time, one or more thresholds and/or other user data. For example, a received user data parameter may indicate that response times which last less than 200 milliseconds for a monitored transaction are to be reported to a user or administrator.

Next, the function is constructed from received user data parameters and stored function data at step 730. The function may be constructed as a distribution of values for a selected function by Enterprise Manager 220. The selected function is the function selected at step 520 discussed above. Enterprise Manager 220 constructs the function values from the function data stored at step 620 in the flowchart of FIG. 6. An example of constructing a function is discussed in more detail below.

After the function is constructed, application data information is retrieved from the constructed function at step 740. The data information retrieved corresponds to the application data information requested at step 710. For example, the constructed function may include response times for instances of a particular transaction. The information retrieved may include a percentage of the response times that occur within a certain period of time (for example, under 150 milliseconds). As discussed above, the information retrieved from the generated function rather than actual application data values.

In some embodiments, constructing the function in step 730 and retrieving data information from the function in step 740 performed simultaneously. In this case, only the portion of the function which corresponds to the application data information to be retrieved is constructed. Thus, if the information requested was for all response times under 150 milliseconds, then only the function having a response time of 150 milliseconds or lower would be constructed. Portions of the function which do not fall within the desired information would not be constructed.

An exemplary construction of a function is now discussed. For this example, a normal function is assumed to be selected as a best fit for a set of application data collected during an initial time period at step 520 of FIG. 5. In the case of a normal distribution function, the total mean, the total count and the sum of squares are the corresponding function parameters. As such, the mean, count and sum of squares comprise the function data which is periodically reported to Enterprise Manager 220 by Agent 140.

In the present example, Enterprise Manager 220 constructs the function from the total mean and the standard deviation of data. In this case, the standard deviation is derived from the total count, total mean and total sum of the squares distribution data. The total count C(pop) may be calculated as the sum of the count for each set of periodically reported distribution data. In some embodiments, the total count may be expressed as the number of instances of the event being counted. Thus, as Agent 140 receives application data after the initial period and reports function data derived from the application data to Enterprise Manager 220 periodically, the total count is taken as the sum of all the reported counts. The total count C(pop) for the entire population of application data may be calculated as:

$$C(pop) = C(0) + C(1) + \ldots C(n),$$

wherein C(pop) is the total count for the population and C(n) is the count reported in each of n reports by Agent 130 to Enterprise Manager 220. The mean value Mean (pop) for the population of the application data for the entire population may be calculated as:

$$\text{Mean}(pop) = \frac{(C(0)*m(0) + C(1)*m(1) + \ldots + C(n)*m(n))}{C(pop)},$$

wherein C(pop) is the count of the entire population of application data, C(n) is the count for each reporting and m(n) is the mean for the application data in the corresponding reporting.

The sum of squares is calculated by squaring the difference between each actual application data value and the corresponding function value (at the same point in time) for the function selected at step 420 and/or 520 of FIGS. 4 and 5, respectively. In particular, the sum of squares Sos(pop) for the entire population of application data may be calculated as:

$$Sos(pop) = \sum_{1}^{n} Sos(n),$$

wherein Sos(n) is the total sum of squares for each of the n reportings. In one embodiment, the sum of squares is calculated at the agent for each period. In this case, Enterprise Manager 220 need only combine the sum of squares received periodically from Agent 140. The standard deviation of the application data distribution may be calculated as:

$$StdDev(pop) = \sqrt{\frac{Sos(pop)}{C(pop)} - \text{Mean}(pop)^2}.$$

Once the mean, count, and standard deviation are known, Enterprise Manager may construct the function. Information for the constructed function can then be obtained, such as a percentage of instances which occurred in a certain period of time. In some cases, limited portions of the full function can be generated. For example, if the application data information requested is for the number of transactions which had a response time greater than 200 milliseconds, than only that part of the function is generated from the distribution data.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A machine implemented method for reporting data, comprising:
    receiving application data for an initial period of time, the application data is received at a processing module on a first server from performance monitoring code inserted into an application that executes on a second server, the application data pertains to performance of the application;

selecting a type of probability distribution, from among a plurality of types of probability distributions, that characterizes the received application data, the selected type of probability distribution has one or more parameters, the selection made by the processing module at the first server;

transferring information from the first server to the performance monitoring code on the second server that identifies the one or more parameters;

accessing subsequent application data that pertains to performance of the application after the initial period of time by the performance monitoring code;

determining values for the one or more parameters for the subsequent application data by the performance monitoring code; and providing the determined values to the processing module at the first server.

2. The method of claim 1, wherein said step of selecting a type of distribution includes:
identifying a best fitting type of distribution from the plurality of types of distributions.

3. The method of claim 1, further comprising:
receiving a request at the first server that specifies a range of values; and
estimating the percentage of the subsequent application data that is within the range of values in the request based on the determined values for the selected type of probability distribution that were provided to the processing module.

4. The method of claim 3, wherein the plurality of types of probability distributions include Gaussian, chi-squared, Rayleigh, Cauchy, Weibull, and exponential.

5. One or more processor readable storage devices having processor readable code embodied on said processor readable storage devices, said processor readable code for programming one or more processors to perform a method comprising:
receiving application data at a first server from performance monitoring code inserted into an application at a second server, the application data pertains to performance of the application for an initial period of time;
selecting a type of probability distribution, from among a plurality of types of probability distributions, that characterizes the received application data, the selected type of probability distribution has one or more parameters;
transferring information that identifies the one or more parameters from the first server to the performance monitoring code on the second server;
accessing subsequent application data that pertains to performance of the application after the initial period of time by the performance monitoring code; and
determining values for the one or more parameters for the subsequent application data by the performance monitoring code; and
providing the determined values to the first server.

6. The one or more processor readable storage devices of claim 5, wherein the application data is associated with one or more instances of a type of transaction.

7. The one or more processor readable storage devices of claim 5, wherein said step of selecting a type of probability distribution includes:
removing a portion of the received application data associated with erroneous transactions.

8. The one or more processor readable storage devices of claim 7, wherein said erroneous transactions include stalled transactions.

9. The one or more processor readable storage devices of claim 5, wherein said step of selecting a type of probability distribution includes:
comparing two or more types of probability distributions to the application data; and
determining a percentage of error associated with the comparison for each type of probability distribution.

10. The one or more processor readable storage devices of claim 5, wherein said processor readable code is further for programming said one or more processors to perform:
receiving a request that specifies a range of values; and
estimating the percentage of the subsequent application data that is within the range of values in the request based on the determined values for the one or more parameters of the selected type of distribution.

11. An apparatus for processing data, comprising:
a communication interface;
a storage device; and
one or more processors in communication with said storage device and said communication interface, said one or more processors perform a method comprising;
receiving application data from performance monitoring code inserted into an application at a remote server, the application data pertains to performance of the application for an initial period of time;
selecting a type of probability distribution, from among a plurality of types of probability distributions, that characterizes the received application data, the selected type of probability distribution has one or more parameters;
transferring information that identifies the one or more parameters from the apparatus to the remote server; and
receiving values for the one or more parameters at the apparatus from the remote server, the values pertain to subsequent performance of the application at the remote server.

12. The apparatus of claim 11 wherein said step of selecting a type of probability distribution includes:
selecting a type of distribution which best approximates the application data.

13. The apparatus of claim 11, wherein said step of selecting a type of probability distribution includes:
removing selected application data associated with one or more erroneous transactions from the application data.

14. The apparatus of claim 11, wherein said step of selecting a type of probability distribution includes:
determining a best fitting type of distribution to the application data.

15. The apparatus of claim 11, wherein said method further comprises:
identifying parameters for the determined type of distribution,
calculating values for the parameters for the determined type of distribution a second set of application data,
receiving a request that specifies a range of values, and
estimating the percentage of the second set of application data that is within the range of values in the request based on the calculated values for the parameters.

16. The apparatus of claim 15, the method further comprising:
providing the percentage of the second set of application data to a user.

17. A machine implemented method for reporting data, comprising:
inserting monitoring code into an application;

determining initial application data from an application by the monitoring code, the initial application data characterizes performance of the application for an initial period of time;

transferring the initial application data to a remote server by the monitoring code;

receiving parameters for a probability distribution that characterizes the initial application data, the parameters received by the monitoring code;

determining subsequent application data from the application by the monitoring code;

determining values for the parameters for the subsequent application data by the monitoring code; and reporting the values to the remote server by the monitoring code.

18. The method of claim 17 wherein said step of retrieving application data includes:

receiving response time data associated with a transaction.

19. The method of claim 17, further comprising:

receiving a request that specifies a range of values; and estimating the percentage of the subsequent application data that is within the range of values in the request based on the reported values for the probability distribution.

20. One or more processor readable storage devices having processor readable code embodied on said processor readable storage devices, said processor readable code for programming one or more processors to perform a method comprising:

determining, by performance monitoring code, initial application data that pertains to performance of an application for an initial period of time;

sending the initial application data from the monitoring code to a processing module on a remote server;

receiving, by the monitoring code, parameters for a probability distribution that characterizes the initial application data;

determining subsequent application data from the application by the monitoring code;

determining values for the parameters for the subsequent application data by the monitoring code; and reporting the values to the processing module on the remote server by the monitoring code.

21. The one or more processor readable storage devices according to claim 20, further comprising:

periodically sending function data to the processing module, the periodically sending function data includes:

receiving additional sets of application data by the performance monitoring code;

determining, by the performance monitoring code, additional values for the parameters for each of the additional sets of subsequent application data; and reporting the additional values to the processing module by the code.

22. The one or more processor readable storage devices according to claim 20 wherein said step of determining values for the parameters includes:

determining total mean data, total count data and sum of squares data for the subsequent application data received after the initial period of time, the determining values is performed by the monitoring code.

23. The one or more processor readable storage devices according to claim 20, wherein the initial application data and the subsequent application data pertain to instances of a type of transaction that is processed by the application.

* * * * *

UNITED STATES PATENT AND TRADEMARK OFFICE
CERTIFICATE OF CORRECTION

PATENT NO. : 7,752,303 B2
APPLICATION NO. : 11/361815
DATED : July 6, 2010
INVENTOR(S) : Peracha et al.

It is certified that error appears in the above-identified patent and that said Letters Patent is hereby corrected as shown below:

Item (73): After "Assignee:" delete "Wily Technology, Inc., Brisbane, CA (US)" and substitute therefor -- Computer Associates Think, Inc., Islandia, New York (US) --

Signed and Sealed this

Sixteenth Day of November, 2010

David J. Kappos
*Director of the United States Patent and Trademark Office*